H. WHIDBOURNE & J. J. LISHMAN.
INTERNAL COMBUSTION ENGINE.
APPLICATION FILED AUG. 24, 1911.
1,025,439.
Patented May 7, 1912.
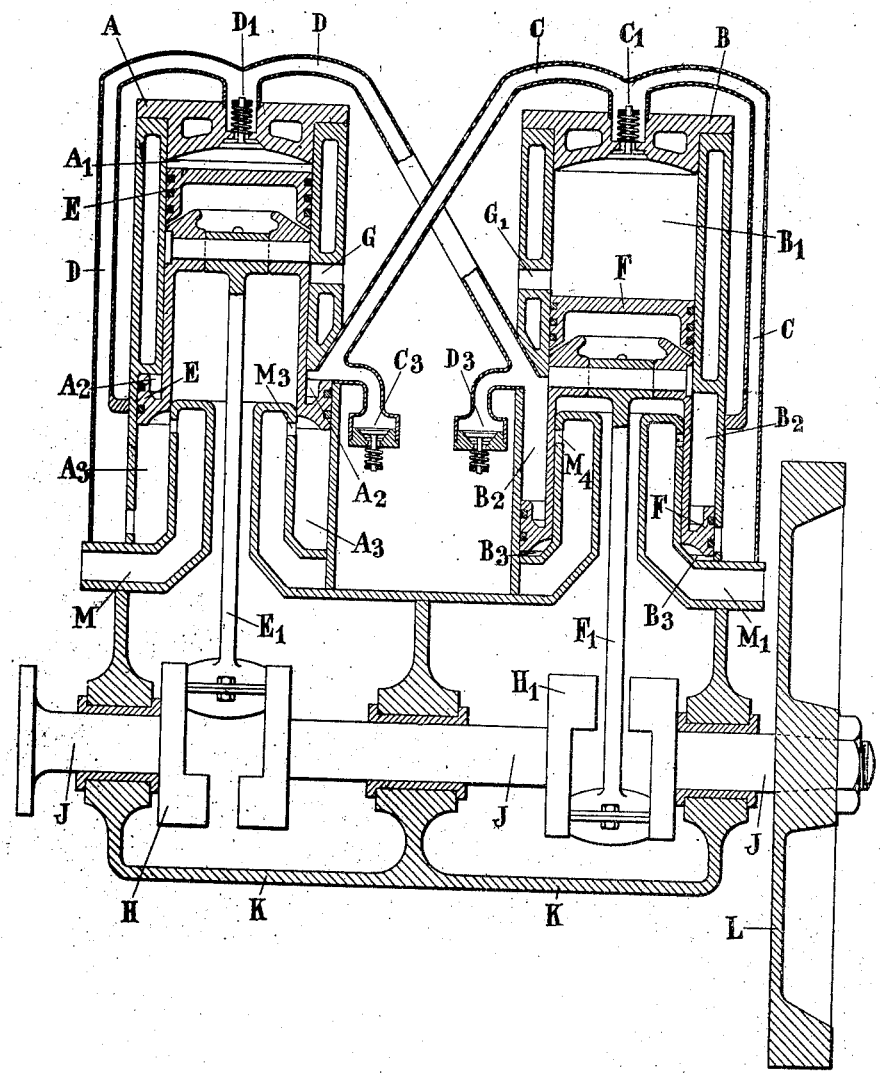
Witnesses:
Olive D. White
Helen S. Morris
Harry Whidbourne
John James Lishman
Inventors
By Emil Bönnelycke
Attorney.

UNITED STATES PATENT OFFICE.

HARRY WHIDBOURNE, OF PLYMOUTH, AND JOHN JAMES LISHMAN, OF SALCOMBE, ENGLAND.

INTERNAL-COMBUSTION ENGINE.

1,025,439. Specification of Letters Patent. Patented May 7, 1912.

Application filed August 24, 1911. Serial No. 645,819.

*To all whom it may concern:*

Be it known that we, HARRY WHIDBOURNE, a subject of the King of Great Britain and Ireland, and residing at Melville, Compton Park, Plymouth, in the county of Devon, England, and JOHN JAMES LISHMAN, a subject of the King of Great Britain and Ireland, and residing at Moult Tors, Salcombe, in the county of Devon, England, have invented certain new and useful Improvements in and Relating to Internal-Combustion Engines, of which the following is a specification.

This invention relates to internal combustion engines of the type or class in which one impulse is given to the crank shaft for each reciprocation of the piston, and has for object an engine having one or more pairs of units of cross-connected cylinders, the functions of each unit being so arranged that a practically constant turning effort is given to the crank shaft.

In carrying this our invention into effect, we employ, for instance, a pair of cylinders of a known design in which the piston is stepped and works within a cylinder of two diameters, the larger end of the piston sliding over a fixed sleeve, thereby forming three distinct chambers. We arrange that one of the chambers (preferably that of the smaller end of the piston) acts as a working cylinder, while the other two chambers act as air and gas pumps. We cross-connect the two cylinders in a manner which we will hereinafter describe with reference to the annexed drawings.

The illustration shows the engine in accordance with this our invention, in section, A and B showing the two cylinders, E and F the two stepped pistons, $E^1$ and $F^1$ the connecting rods, H and $H^1$ the cranks, J the crank shaft, K the crank case and L the flywheel. $A^1$ and $B^1$ show the two working chambers, $A^2$ and $B^2$ the air chambers or pumps and $A^3$ and $B^3$ the gas chambers or pumps. M and $M^1$ show the gas inlets, $M^3$ and $M^4$ gas parts, $C^3$ and $D^3$ the air inlet valves and G and $G^1$ the exhaust ports.

The two cylinders are cross-connected in the following manner:—The upper annular chamber $A^2$ of the cylinder A is connected with the lower annular chamber $B^3$ of the cylinder B by means of the conduit C, a feature of the arrangement being that this conduit, on passing to the lower annular chamber $B^3$ of the cylinder B puts the supply or induction valve $C^1$ of the working cylinder $B^1$ into communication with both, the valve $C^1$ occupying a position approximately midway between the two as shown. Likewise, the upper annular chamber $B^2$ of the cylinder B is connected by the conduit D to the lower annular chamber $A^3$ of the cylinder A, the supply valve $D^1$ of the working cylinder $A^1$ being in communication with both the lower annular chamber $A^3$ and the upper annular chamber $B^2$.

The operation and function of this our improved engine are as follows: During the inward stroke of the piston E of the cylinder A and the outward stroke of the piston F of the cylinder B a charge of air previously induced and trapped in the upper annular chamber $A^2$ of the cylinder A is compressed within the conduit C at one end and simultaneously a charge of gas (explosive mixture) previously induced and trapped in the lower annular chamber $B^3$ of the cylinder B, is compressed within the conduit, mainly at the other end. The capacity of the conduit is so arranged that all the gas and the major portion of the air are lodged within that portion of the conduit between the supply valve $C^1$ and the lower annular chamber $B^3$ of the cylinder B. On the pressure within the working cylinder $B^1$ falling sufficiently, (after a previous working stroke) the compressed and independent charges of air and gas in the conduit C enter the cylinder—the air preceding to effect a scavenge while the exhaust port G is open—and the gas to constitute the working charge. On the return stroke of the piston F of the cylinder B, the charge is compressed and afterward ignited in any well-known manner. While these functions have been taking place a similar cycle of functions has been occurring within the cylinder A with the result that on the piston F of the cylinder B reaching the end of the working stroke, the piston E of the cylinder A has arrived at the end of its compression stroke and the charge is fired, with the desirable result that the crank shaft receives two impulses for each revolution.

The fact that the charge of air precedes the gas in order to scavenge may be explained as follows: Upon the down stroke of the piston E and the upstroke of the piston F the gas and air in the conduit C will be rarefied and at the ends of the strokes more gas and air will be drawn in, the load on the valves $C^3$ and $D^3$ being so adjusted that these valves open at the same or approximately the same moment as the gas inlets so that air and gas enter at approximately the same time at opposite ends of the conduit. Upon the return strokes air in chamber $A^2$ will be forced into the part of the conduit between the valve $C^1$ and chamber $B^3$, above the gas therein, due to the enlargement of that part of the conduit, and upon the opening of the valve $C^1$ the air above the gas will first flow into the cylinder.

It is also obvious that while retaining the functions herein described we may vary the construction and arrangement of the pistons, chambers and ducts and other parts without departing from the spirit of the invention.

An advantage inherent with the construction of the engine is that the crank shaft can be arranged to rotate in either direction depending on which direction it is started.

Having now described our invention what we claim as new and desire to secure by Letters Patent is:—

1. An internal combustion engine comprising cylinders arranged in pairs each of which has a cylindrical working chamber, a fixed sleeve forming with the walls of the cylinder, an annular chamber, a working piston having an enlarged portion dividing this annular chamber into two compartments and sliding over said fixed sleeve, means for supplying air to one of the compartments of the annular chamber in each cylinder, means for supplying gas to the other compartment of the annular chamber, conduits cross-connecting the air compartment in the annular chamber of one cylinder and the gas compartment in the annular chamber of the other cylinder and connections between said cross-connecting conduits and the cylindrical working chambers each cross-connecting conduit being so positioned and constructed that a charge of gas is drawn in at one end and a charge of air at the other end simultaneously during one stroke of the engine while these independent charges of air and gas are simultaneously compressed from each end of the conduit during the next stroke whereby independent charges of air and gas are transferred to said cross-connections and thence to the cylindrical working chambers.

2. An internal combustion engine comprising cylinders arranged in pairs each of which has a cylindrical working chamber, a fixed sleeve forming with the walls of the cylinder, an annular chamber, a working piston having an enlarged portion dividing this annular chamber into two compartments and sliding over said fixed sleeve, means for supplying air to one of the compartments of the annular chamber in each cylinder, means for supplying gas to the other compartment of the annular chamber, conduits cross-connecting the air compartment in the annular chamber of one cylinder and the gas compartment in the annular chamber of the other cylinder, each cross-connecting conduit having an enlargement at the gas inlet end so that a charge of gas is drawn in at one end and a charge of air at the other end simultaneously during one stroke of the engine while these independent charges of air and gas are simultaneously compressed from each end of the conduit during the next stroke, and a connection between each cylindrical working chamber and that one of the cross-connecting conduits which connects the gas receiving compartment in the annular chamber of the same cylinder with the air receiving compartment in the annular chamber of the fellow cylinder whereby one compartment of the annular chambers is utilized for supplying a scavenging charge for the cylindrical working chamber of the fellow cylinder and the opposite compartment of the other annular chamber is utilized for supplying a working charge of gas for the same cylinder.

In testimony whereof we have signed our names to this specification in the presence of two subscribing witnesses.

HARRY WHIDBOURNE.
JOHN JAMES LISHMAN.

Witnesses:
ARTHUR JOSEPH FORSHEW,
ARCHIBALD HARDING.